US010721435B2

(12) United States Patent
Saito et al.

(10) Patent No.: US 10,721,435 B2
(45) Date of Patent: *Jul. 21, 2020

(54) VIDEO TRANSMISSION APPARATUS, VIDEO TRANSMISSION METHOD, AND PROGRAM

(71) Applicant: NEC CORPORATION, Tokyo (JP)

(72) Inventors: Mika Saito, Tokyo (JP); Kenichiro Ida, Tokyo (JP); Ryoma Oami, Tokyo (JP); Junko Nakagawa, Tokyo (JP); Hiroshi Yamada, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/402,363

(22) Filed: May 3, 2019

(65) Prior Publication Data
US 2019/0260961 A1    Aug. 22, 2019

Related U.S. Application Data

(63) Continuation of application No. 16/066,448, filed as application No. PCT/JP2016/085283 on Nov. 29, 2016.

(30) Foreign Application Priority Data

Dec. 28, 2015    (JP) .................................. 2015-256119

(51) Int. Cl.
  *H04N 7/04*    (2006.01)
  *G08B 25/00*    (2006.01)
  (Continued)

(52) U.S. Cl.
  CPC ................. *H04N 7/04* (2013.01); *G06T 7/20* (2013.01); *G06T 7/50* (2017.01); *G06T 7/70* (2017.01);
  (Continued)

(58) Field of Classification Search
  CPC ........................................................ H04N 7/04
  (Continued)

(56) References Cited

U.S. PATENT DOCUMENTS

2003/0215010 A1    11/2003    Kashiwa
2013/0147962 A1*    6/2013    Siann .................... H04N 7/181
                                                  348/159

(Continued)

FOREIGN PATENT DOCUMENTS

JP    2003-274359 A    9/2003
JP    2005-268972 A    9/2005

(Continued)

OTHER PUBLICATIONS

International Search Report for PCT/JP2016/085283 dated Feb. 7, 2017.

*Primary Examiner* — Eileen M Adams
*Assistant Examiner* — Daniel T Tekle
(74) *Attorney, Agent, or Firm* — Sughrue Mion, PLLC

(57) ABSTRACT

A video transmission apparatus (10) includes: a specified-position information acquisition unit (110) that acquires specified-position information indicating a specified position in an area to be surveilled including each imaging region corresponding to each of a plurality of imaging apparatuses; and a video transmission control unit (120) that selects at least one imaging apparatus from among the plurality of imaging apparatuses using imaging position information indicating a position or an imaging range of each of the plurality of imaging apparatuses and the specified-position information and transmits a video captured by the selected imaging apparatus to a video sharing apparatus that is to share the video.

15 Claims, 11 Drawing Sheets

(51) Int. Cl.
  *G08B 25/04* (2006.01)
  *G08B 13/196* (2006.01)
  *H04N 5/232* (2006.01)
  *G06T 7/50* (2017.01)
  *G06T 7/70* (2017.01)
  *G06T 7/20* (2017.01)
  *H04N 5/247* (2006.01)
  *H04N 7/18* (2006.01)

(52) U.S. Cl.
  CPC ... *G08B 13/1966* (2013.01); *G08B 13/19645* (2013.01); *G08B 13/19669* (2013.01); *G08B 13/19671* (2013.01); *G08B 13/19684* (2013.01); *G08B 25/00* (2013.01); *G08B 25/04* (2013.01); *H04N 5/23293* (2013.01); *H04N 5/247* (2013.01); *H04N 7/181* (2013.01); *G06T 2207/30232* (2013.01); *G06T 2207/30241* (2013.01)

(58) Field of Classification Search
  USPC .......................................................... 348/159
  See application file for complete search history.

(56) References Cited

U.S. PATENT DOCUMENTS

2014/0150042 A1\* 5/2014 Pacor ............... H04N 21/21805
                                                        725/116
2017/0004356 A1\* 1/2017 Gil ..................... G06K 9/00892

FOREIGN PATENT DOCUMENTS

| JP | 2007-221693 A | 8/2007 |
| JP | 2011-018094 A | 1/2011 |
| JP | 2015-005851 A | 1/2015 |
| JP | 2015-008432 A | 1/2015 |
| JP | 2015-082820 A | 4/2015 |

\* cited by examiner

FIG. 4

| IDENTIFICATION INFORMATION OF IMAGING APPARATUS | IMAGING POSITION INFORMATION | ADDRESS INFORMATION |
|---|---|---|
| C001 | • INSTALLATION POSITION : $(x_1, y_1)$<br>• MAGING RANGE : $\{(x_{C1}, y_{C1}), \cdots\}$ | xxx.xxx.xxx.xxx |
| C002 | • INSTALLATION POSITION : $(x_2, y_2)$<br>• MAGING RANGE : $\{(x_{C2}, y_{C2}), \cdots\}$ | yyy.yyy.yyy.yyy |
| ⋮ | ⋮ | ⋮ |

FIG. 6

| IDENTIFICATION INFORMATION OF GUARD | GUARD POSITION INFORMATION | ADDRESS INFORMATION OF IMAGE RECEIVING APPARATUS |
|---|---|---|
| ID001 | $(X_1, Y_1)$ | aaa.aaa.aaa.aaa |
| ID002 | $(X_2, Y_2)$ | bbb.bbb.bbb.bbb |
| ID003 | $(X_3, Y_3)$ | — |
| ⋮ | ⋮ | ⋮ |

VIDEO TRANSMISSION APPARATUS, VIDEO TRANSMISSION METHOD, AND PROGRAM

This application is a Continuation of U.S. application Ser. No. 16/066,448 filed Jun. 27, 2018, which is a National Stage of International Application No. PCT/JP2016/085283 filed Nov. 29, 2016, claiming priority based on Japanese Patent Application No. 2015-256119 filed Dec. 28, 2015, the entire contents of all of which are incorporated herein by reference.

TECHNICAL FIELD

The present invention relates to a technique for assisting a surveillance operation.

BACKGROUND ART

There is a demand for sharing a video captured by, for example, a surveillance camera or a wearable camera worn by a guard in order to smoothly perform a surveillance operation.

Disclosed in the following Patent Documents 1 and 2 is an example of a technique related to a surveillance system that uses a video captured by, for example, a surveillance camera or a wearable camera worn by a guard. Disclosed in the following Patent Document 1 is a technique which analyzes the video captured by the surveillance camera to detect a suspicious person and transmits a video including the suspicious person to an information display terminal of a guard. Disclosed in the following Patent Document 2 is a technique which changes priorities each set to a plurality of cameras in a store, depending on the positional information of a clerk, selects a video captured by a camera with a high priority among the plurality of cameras, and displays the video on a display device of a surveillant.

RELATED DOCUMENT

Patent Document

[Patent Document 1] Japanese Patent Application Publication No. 2011-018094

[Patent Document 2] Japanese Patent Application Publication No. 2007-221693

SUMMARY OF THE INVENTION

Technical Problem

In the technique disclosed in the above-described Patent Document 1, it is necessary to analyze the videos captured by the plurality of cameras in order to detect a suspicious person and a large load is likely to be applied to an apparatus that implements a function of sharing a video including a suspicious person. In the technique disclosed in the above-described Patent Document 2, the video to be shared is selected from among a plurality of videos according to the priority of the camera. Therefore, there is a concern that a necessary video will not be shared when the video is needed.

The invention has been made in view of the above-mentioned problems and an object of the invention is to provide a technique for sharing a necessary video when the video is needed while preventing an increase in machine load.

Solution to Problem

According to the invention, there is provided a video transmission apparatus including: a specified-position information acquisition unit that acquires specified-position information indicating a specified position in an area to be surveilled including each imaging region corresponding to each of a plurality of imaging apparatuses; and a video transmission control unit that selects at least one imaging apparatus from among the plurality of imaging apparatuses using imaging position information indicating a position or an imaging range of each of the plurality of imaging apparatuses and the specified-position information and transmits a video captured by the selected imaging apparatus to a video sharing apparatus that is to share the video.

According to the invention, there is provided a video transmission method performed by a computer, the method including: acquiring specified-position information indicating a specified position in an area to be surveilled including each imaging region corresponding to each of a plurality of imaging apparatuses; and selecting at least one imaging apparatus from among the plurality of imaging apparatuses using imaging position information indicating a position or an imaging range of each of the plurality of imaging apparatuses and the specified-position information and transmitting a video captured by the selected imaging apparatus to a video sharing apparatus that is to share the video.

According to the invention, there is provided a program that causes a computer to function as: a specified-position information acquisition unit that acquires specified-position information indicating a specified position in an area to be surveilled including each imaging region corresponding to each of a plurality of imaging apparatuses; and a video transmission control unit that selects at least one imaging apparatus from among the plurality of imaging apparatuses using imaging position information indicating a position or an imaging range of each of the plurality of imaging apparatuses and the specified-position information and transmits a video captured by the selected imaging apparatus to a video sharing apparatus that is to share the video.

Advantageous Effects of Invention

According to the invention, it is possible to share a necessary video when the video is needed, while preventing an increase in machine load.

BRIEF DESCRIPTION OF THE DRAWINGS

The above-mentioned object, other objects, features, and advantages of the invention will become apparent from the following preferred example embodiments and the following accompanying drawings.

FIG. 4 is a diagram illustrating an example of a storage unit that stores imaging position information.

FIG. 6 is a diagram illustrating an example of a storage unit that stores guard position information.

DESCRIPTION OF EMBODIMENTS

Figure 1:
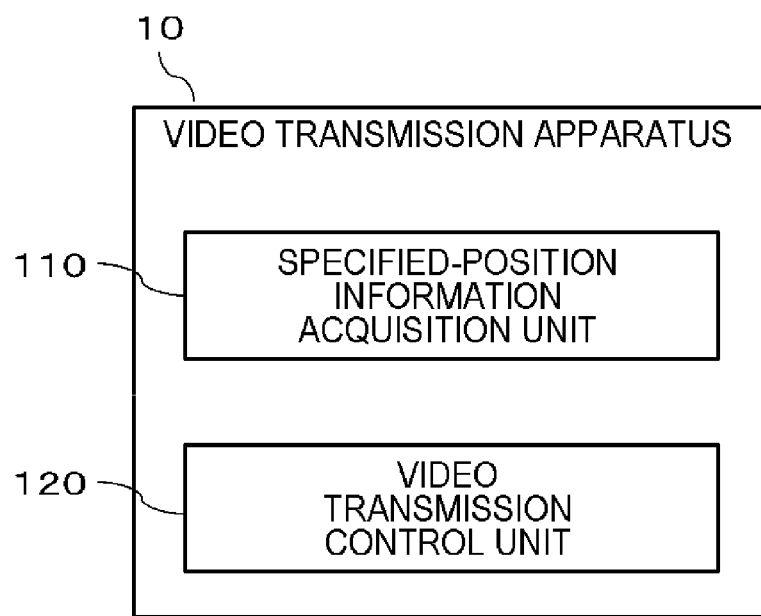
FIG. 1 is a conceptual diagram illustrating the functional configuration of a video transmission apparatus according to a first example embodiment.

A video transmission apparatus according to the invention transmits a video corresponding to a specified position in an area to be surveilled to video receiving apparatuses (video sharing apparatuses) of a plurality of persons such that the video is shared by the plurality of persons. In each of the following example embodiments, a video transmission apparatus according to the invention, a video transmission method that is performed by a computer functioning as the video transmission apparatus, a program that causes a computer to operate as the video transmission apparatus according to the invention will be described with reference to the drawings. However, in all of the drawings, the same components are denoted by the same reference numerals and the description thereof will not be repeated. In addition, in each block diagram except a diagram illustrating a hardware configuration, each block does not indicate a hardware unit, but indicates a functional unit.

First Example Embodiment

[Functional Configuration]

FIG. 1 is a conceptual diagram illustrating the functional configuration of a video transmission apparatus 10 according to a first example embodiment. As illustrated in FIG. 1, the video transmission apparatus 10 according to this example embodiment includes a specified-position information acquisition unit 110 and a video transmission control unit 120.

The specified-position information acquisition unit 110 acquires specified-position information indicating a specified position in an area to be surveilled, the area including each imaging region corresponding to each of a plurality of imaging apparatuses. The area to be surveilled is an area that is determined to be a surveillance area in a security plan such as a so-called crowd control plan. In some cases, a temporary imaging apparatus (for example, a wearable camera that is worn by a guard or a camera that is provided in a security apparatus such as a drone) is installed in the area to be surveilled, in addition to an imaging apparatus such as a surveillance camera that has been installed in the area. The videos of a plurality of regions in the area to be surveilled are captured by a plurality of different imaging apparatuses and are used for a surveillance operation. The surveillance operation in the area to be surveilled is mainly performed according to instructions from a surveillance center that controls the overall surveillance operation. For example, a surveillant in the surveillance center receives a report indicating that an unexpected situation has occurred in a certain spot from the guard performing the surveillance operation on the spot. The surveillant in the surveillance center performs an input operation of specifying the position indicated by the report, on the video transmission apparatus 10 or other apparatuses that are connected to the video transmission apparatus 10 in a communicable manner. The specified-position information acquisition unit 110 of the video transmission apparatus 10 acquires specified-position information which is generated according to the input operation of the surveillant in the surveillance center. In addition, the specified-position information acquisition unit 110 may read and acquire the specified-position information which has been generated on the basis of a position to be closely watched, a position with a high possibility of occurrence of a risk (a crime or an accident), or the like and then stored in a predetermined storage unit. However, the method of the specified-position information acquisition unit 110 acquiring the specified-position information is not limited to these examples.

The video transmission control unit 120 selects at least one imaging apparatus using imaging position information indicating the position or the imaging range of each of the plurality of imaging apparatuses and the specified-position information. In other words, the video transmission control unit 120 identifies and selects an imaging apparatus that captures a video related to the position indicated by the specified-position information, on the basis of the positional information (imaging position information) of the imaging apparatus. In addition, the video transmission control unit 120 transmits the video captured by the selected imaging apparatus to a video sharing apparatus that is to share the video. The video sharing apparatus is selected from, for example, a video receiving apparatus installed in the surveillance center (an apparatus that receives the video transmitted from the video transmission control unit 120 and displays the video on a display device) and a video receiving apparatus carried by the guard.

Advantageous Effect

In this example embodiment, a spot with the high urgency and importance in surveillance is specified and an imaging apparatus that captures a video related to the spot, that is, a video to be shared is selected. In addition, the video captured by the selected imaging apparatus is transmitted to the video sharing apparatus that is to share the video. Therefore, according to this example embodiment, it is possible to transmit the video with the high necessity for sharing to the video sharing apparatus when the video is needed. In addition, since only the video captured by the selected imaging apparatus is shared, it is possible to reduce the amount of data of the video to be shared and to reduce a machine load.

In addition, according to this example embodiment, a video captured in a spot with the high urgency or importance is shared by the persons that perform a surveillance operation. In a case in which the video captured by the selected imaging apparatus is shared by the video sharing apparatus in the surveillance center, the surveillant can check the shared video and give appropriate instructions to the guard in the spot. In a case in which the video captured by the selected imaging apparatus is shared by the video sharing apparatus carried by the guard in the spot, the guard can grasp the situation in the spot by checking the video and thereby rapidly cope with the situation upon arriving at the spot.

Hereinafter, the video transmission apparatus 10 according to this example embodiment will be described in more detail.

[Hardware Configuration]

Each functional unit of the video transmission apparatus 10 may be implemented by hardware (for example, a hard-wired electronic circuit) that implements each functional unit or a combination of hardware and software (for example, a combination of an electronic circuit and a program controlling the electronic circuit). Hereinafter, a case in which each functional unit of the video transmission apparatus 10 is implemented by a combination of hardware and software will be further described.

Figure 2:
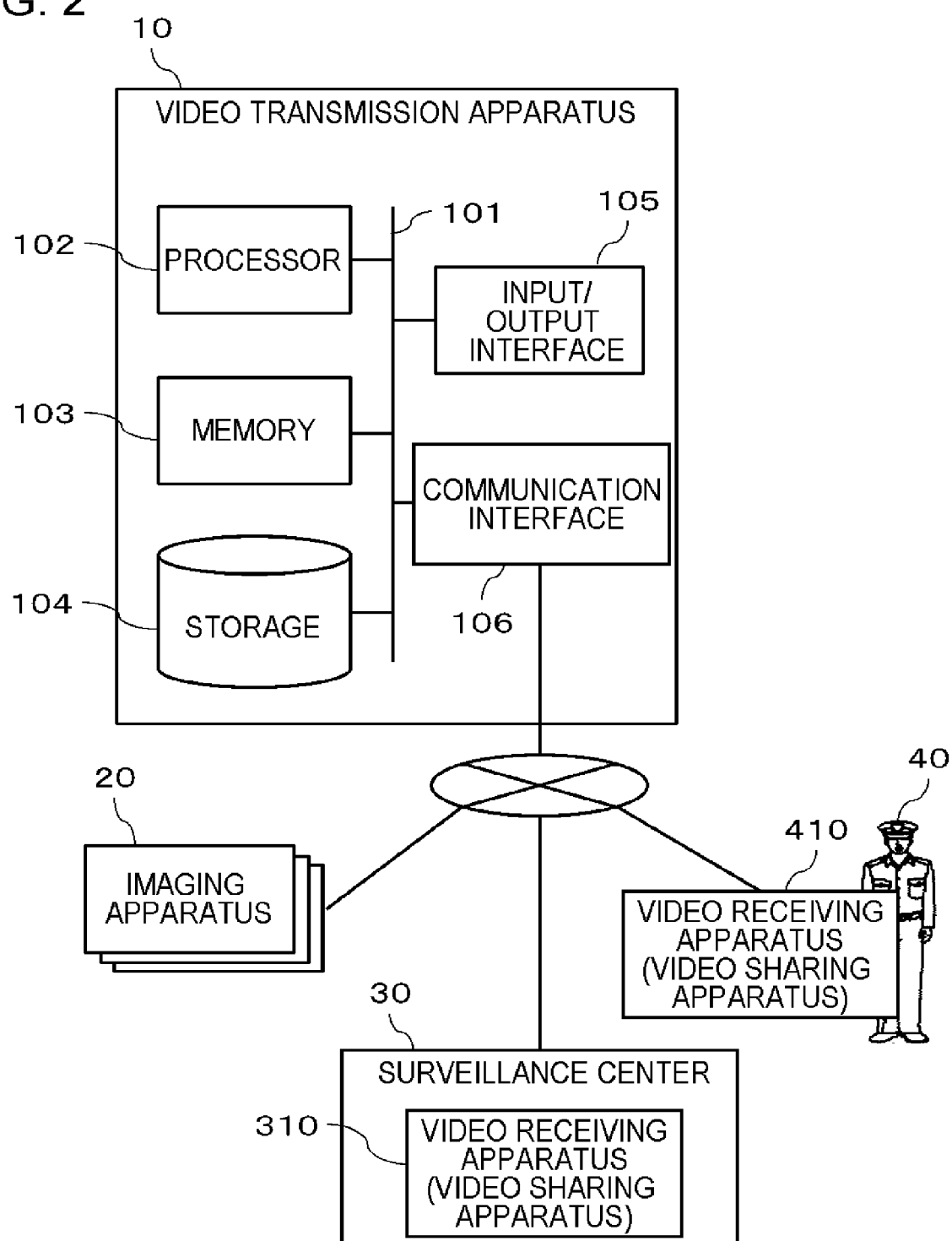
FIG. 2 is a diagram illustrating the hardware configuration of the video transmission apparatus.

FIG. 2 is a diagram illustrating the hardware configuration of the video transmission apparatus 10. The video transmission apparatus 10 includes a bus 101, a processor 102, a memory 103, a storage 104, an input/output interface 105, and a communication interface 106. The bus 101 is a data transmission route for transmitting and receiving data. The processor 102, the memory 103, the storage 104, the input/output interface 105, and the communication interface 106 transmit and receive data through the bus 101. However, a method for connecting, for example, the processor 102 and the like is not limited to the bus connection. The processor 102 is an arithmetic processing device such as a central processing unit (CPU) or a graphics processing unit (GPU). The memory 103 is, for example, a random access memory (RAM) or a read only memory (ROM). The storage 104 is a storage device such as a hard disk drive (HDD), a solid state drive (SSD), or a memory card. The storage 104 may be a memory such as a RAM or a ROM.

The input/output interface 105 is an interface for connecting the video transmission apparatus 10 and an input/output device. For example, the input/output interface 105 is connected to an input device, such as a mouse or a keyboard, a display device, such as a cathode ray tube (CRT) display or a liquid crystal display (LCD), and a touch panel in which the input device and the display device are integrated with each other. However, these devices may not be connected to the input/output interface 105.

The communication interface 106 connects the video transmission apparatus 10 to various networks, such as the Internet, such that the video transmission apparatus 10 communicates with an external apparatus through the network. For example, the video transmission apparatus 10 is connected to an imaging apparatus 20, a video receiving apparatus 310 in a surveillance center 30, or a video receiving apparatus 410 of a guard 40 through the network.

Here, the imaging apparatus 20 may be a fixed camera or a mobile camera. The fixed camera is, for example, a camera fixed at a predetermined position such as a surveillance camera. The mobile camera is, for example, a camera that is provided in a vehicle or a security apparatus (for example, a drone) or a wearable camera that is worn by a guard or a policeman. The mobile camera has a function of acquiring its own positional information (for example, a function of acquiring global positioning system (GPS) information or information about a base station covering the mobile camera in wireless communication). The mobile camera acquires its own positional information, for example, at a predetermined interval and updates a storage unit (illustrated in FIG. 4 below) that stores the positional information of each imaging apparatus, using the positional information. With this configuration, even in a case in which a person that wears the mobile camera or an apparatus provided with the mobile camera moves to another spot, the video transmission control unit 120 can grasp the imaging position information of the mobile camera, using the information in the storage unit. For the mobile camera, for example, in a case in which a guard (fixed-position guard) that is positioned in a predetermined spot and does not leave the spot carries the mobile camera, the mobile camera may not have the function of acquiring the positional information. This is because the position of the mobile camera is not greatly changed. In this case, the positional information of the spot in which the fixed-position guard is positioned is stored as the imaging position information.

The surveillance center 30 controls the overall surveillance operation performed in the area to be surveilled. The video receiving apparatus 310 in the surveillance center 30 can receive the video transmitted from the video transmission control unit 120 of the video transmission apparatus 10 and display the video on a display device (not illustrated). The surveillant in the surveillance center 30 checks the video displayed on the display device and gives appropriate instructions to the guard 40 performing a surveillance operation on the spot. The video receiving apparatus 310 is installed in the surveillance center. At least one guard 40 performing a surveillance operation on the spot may carry the video receiving apparatus 410 that receives a video from the video transmission apparatus 10. In this example embodiment, one or both of the video receiving apparatus 310 and the video receiving apparatus 410 function as a "video sharing apparatus" according to the invention.

The storage 104 stores program modules that implement the functions of each of the above-described processing units of the video transmission apparatus 10. The processor 102 executes each program module to implement the function of each processing unit corresponding to the program module. Here, when the processor 102 executes each program module, the processor 102 may read the program modules into the memory 103 and then execute the program modules, or may execute the program modules, without reading the program modules into the memory 103.

The hardware configuration of the video transmission apparatus 10 is not limited to the configuration illustrated in FIG. 2. For example, each program module may be stored in the memory 103. In this case, the video transmission apparatus 10 may not include the storage 104.

Operation Example

Figure 3:
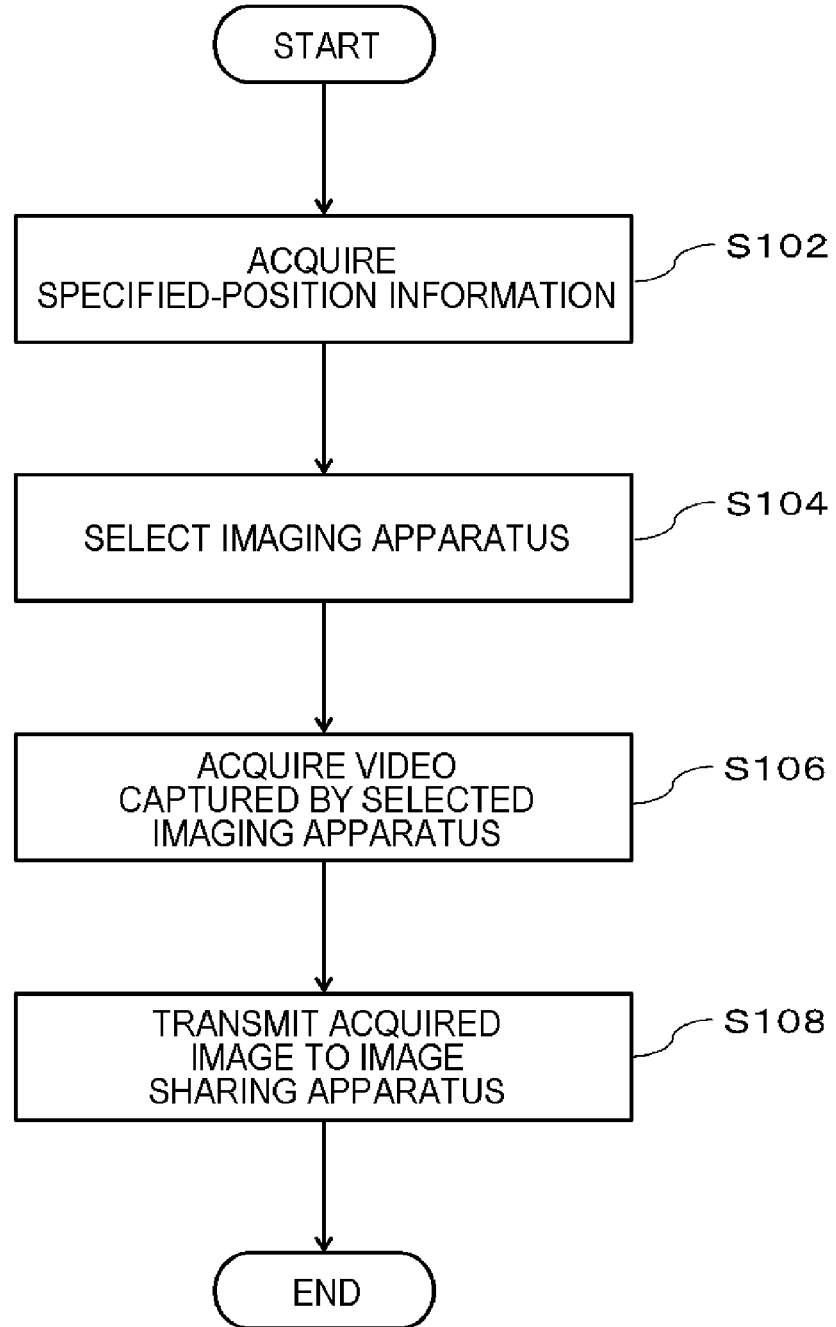
FIG. 3 is a flowchart illustrating the flow of a process of the video transmission apparatus according to the first example embodiment.

The flow of a process performed by the video transmission apparatus 10 according to this example embodiment will be described with reference to FIG. 3. FIG. 3 is a flowchart illustrating the flow of the process of the video transmission apparatus 10 according to the first example embodiment.

First, the specified-position information acquisition unit 110 acquires specified-position information (S102). Then, the video transmission control unit 120 selects an imaging apparatus 20 using the specified-position information acquired in S102 (S104). Specifically, processes which will be described in the following examples are performed.

First Example

The specified-position information acquisition unit 110 acquires the specified-position information from the surveillance center 30. Specifically, the surveillant in the surveillance center 30 performs an operation of inputting the specified-position information on a map displayed on the display device of the surveillance center 30. For example, the surveillant in the surveillance center 30 specifies the position of the area to be surveilled on the map with the mouse or the touch panel, on the basis of a report from the guard 40 on the spot or a predetermined security plan. Then, coordinate information corresponding to the specified position is generated. The specified-position information acquisition unit 110 acquires the coordinate information of the specified position as the specified-position information.

The video transmission control unit 120 selects an imaging apparatus 20 which is a generation source of the video to be shared, using the coordinate information acquired by the specified-position information acquisition unit 110 and the imaging position information of each imaging apparatus. The imaging position information of each imaging apparatus is stored in a predetermined storage unit, for example, in the format illustrated in FIG. 4.

FIG. 4 is a diagram illustrating an example of the storage unit that stores the imaging position information. In the example illustrated in FIG. 4, the imaging position information is stored together with the identification information of each imaging apparatus 20. The imaging position information includes information indicating the position where each imaging apparatus 20 is present or information indicating the imaging range of each imaging apparatus 20. As illustrated in FIG. 4, the address information (for example, an internet protocol (IP) address) of the imaging apparatus 20 is further stored. The address information is used, for example, when the video transmission control unit 120 acquires a video from the imaging apparatus 20. For example, the information illustrated in FIG. 4 may be stored in the storage 104 of the video transmission apparatus 10 or a storage (not illustrated) of another apparatus that is connected to the video transmission apparatus 10 in a communicable manner.

The video transmission control unit 120 converts the specified-position information (coordinate information) acquired by the specified-position information acquisition unit 110, using a function that converts the positional information of a coordinate system on the map into the positional information of a coordinate system to which the imaging position information belongs. Thus, the video transmission control unit 120 can compare the specified-position information acquired by the specified-position information acquisition unit 110 with the imaging position information in the storage unit. The video transmission control unit 120 selects an imaging apparatus 20 which is a generation source of the video to be shared, on the basis of the result of the comparison of the specified-position information with the positional information of each imaging apparatus 20 and the imaging position information of each imaging apparatus 20.

Figure 5:
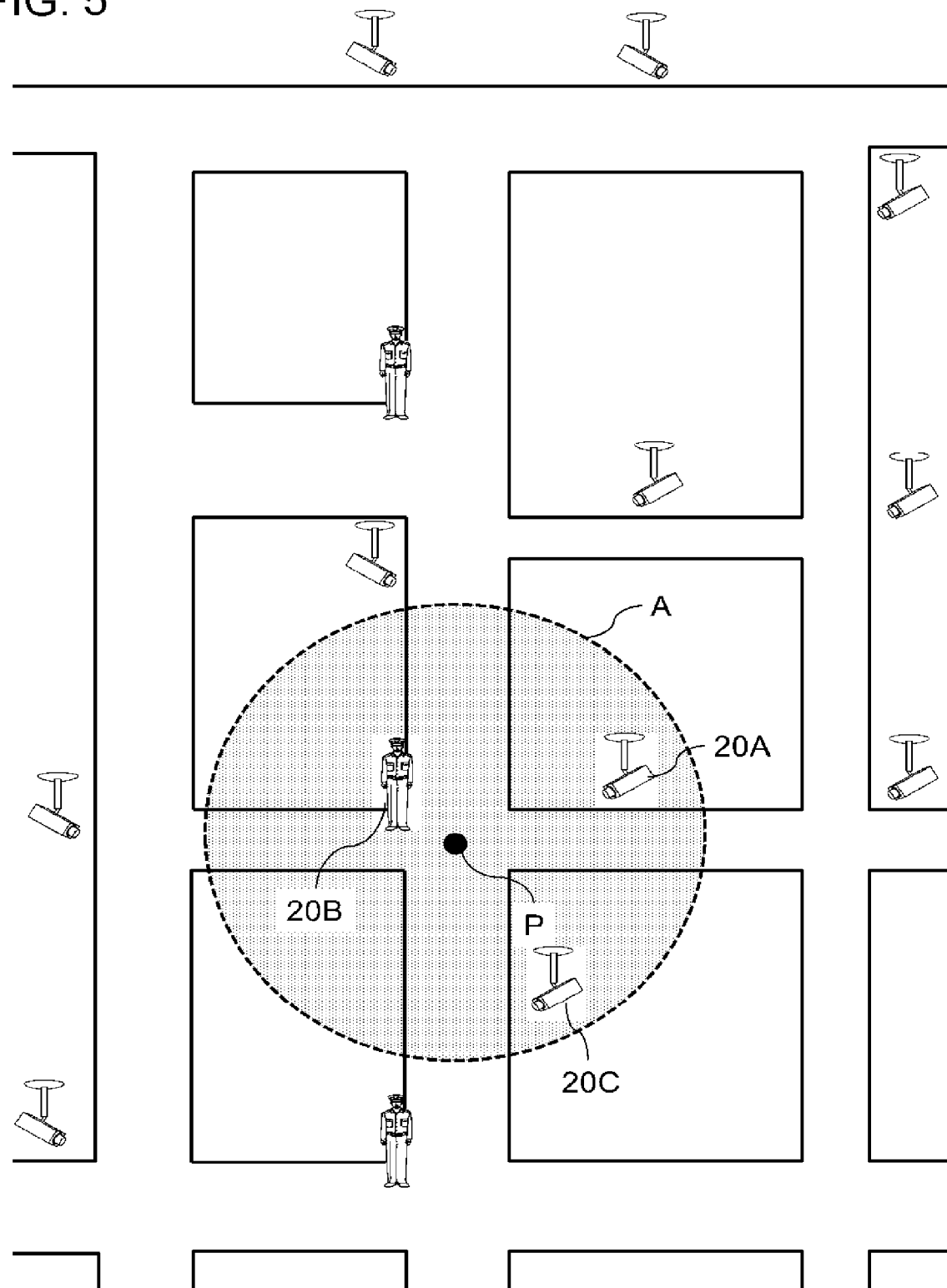
FIG. 5 is a diagram illustrating the process flow in which the video transmission apparatus according to the first example embodiment selects an imaging apparatus.

The above-mentioned process will be described in more detail with reference to FIG. 5. FIG. 5 is a diagram illustrating the flow of the selection of the imaging apparatus 20 by the video transmission apparatus 10 according to the first example embodiment. FIG. 5 illustrates a case in which the surveillant in the surveillance center 30 selects a point P on the map displayed on the display device on the basis of the reports received from the guards on the spot. In this case, the specified-position information acquisition unit 110 acquires the coordinate information of the specified point P as the specified-position information. The video transmission control unit 120 converts the coordinates of the point P acquired by the specified-position information acquisition unit 110, using the function of converting the positional information of the coordinate system on the map into the positional information of the coordinate system to which the imaging position information belongs. Then, the video transmission control unit 120 selects an imaging apparatus 20 that is present in a predetermined range having the point P as a reference point, as the imaging apparatus 20 which is a generation source of the video to be shared. In the example illustrated in FIG. 5, the video transmission control unit 120 defines a circular area A with a predetermined radius which has the point P as the center, as the predetermined range. Then, the video transmission control unit 120 identifies an imaging apparatus 20 of which the positional information indicated by the imaging position information overlaps at least a portion of the positional information of the defined area A, as the imaging apparatus 20 which is a generation source of the video to be shared. In the example illustrated in FIG. 5, the video transmission control unit 120 identifies three imaging apparatuses 20A, 20B, and 20C as the imaging apparatuses 20 which are the generation sources of the videos to be shared. The imaging apparatuses 20A and 20C are fixed cameras, such as so-called surveillance cameras, and the imaging apparatus 20B is a mobile camera such as a wearable camera worn by a guard.

However, the invention is not limited to the example illustrated in FIG. 5. The surveillant in the surveillance center 30 may not specify one point on the map, but instead may specify the range of the position where the imaging apparatus 20 is selected. Then, the coordinate information (specified-position information) of the range may be transmitted to the specified-position information acquisition unit 110. In this case, the video transmission control unit 120 selects the imaging apparatus 20 which is a generation source of the video to be shared, using the specified-position information of the range specified by the surveillance center 30 instead of the predetermined area A. In addition, the specified-position information may be, for example, text data such as an address or a zip code. In this case, the specified-position information acquisition unit 110 acquires the positional information of an area indicated by the received text data on the basis of the text data. Then, the video transmission control unit 120 selects the imaging apparatus 20 which is a generation source of the video to be shared, on the basis of the positional information acquired from the text data and the imaging position information of each imaging apparatus 20.

Second Example

The positional information of a predetermined place (for example, a place with high surveillance priority in terms of security) may be stored as the specified-position information in a predetermined storage unit and the specified-position information acquisition unit 110 may read the specified-position information from the storage unit. In this case, similarly to the first example, the imaging apparatus 20 which is a generation source of the video to be shared is identified on the basis of the specified-position information and the imaging position information of each imaging apparatus 20.

Third Example

The specified-position information acquisition unit 110 may identify a place where the probability of a risk occurring is high, on the basis of information (risk prediction information) about risk (an accident or a crime) prediction in the area to be surveilled and may acquire the positional information of the place as the specified-position information. The risk prediction information is generated from statistical data such as the date and time when an accident or a crime occurred in the past in the area to be surveilled. In addition, the risk prediction information may be generated on the basis of the video captured by each imaging apparatus 20 by analyzing, for example, the degree of congestion of persons or vehicles in the place in the video or the traffic and flow rate of persons or vehicles in the place in the video. The specified-position information acquisition unit 110 identifies a place with a risk of a predetermined level or more from the risk prediction information and acquires the positional information of the place as the specified-position information. Similarly to the first example, the video transmission control unit 120 identifies the imaging apparatus 20 which is a generation source of the video to be shared, on the basis of the specified-position information acquired on the basis of the risk prediction information and the imaging position information of each imaging apparatus 20.

Returning to the flowchart illustrated in FIG. 3, the video transmission control unit 120 acquires the video captured by the imaging apparatus 20 selected in S104 (S106). The video transmission control unit 120 communicates with the imaging apparatus 20 selected in S104, using, for example, the address information illustrated in FIG. 4, and acquires the video to be shared from the imaging apparatus 20. However, the invention is not limited thereto. For example, the specified-position information acquisition unit 110 may acquire the video to be shared from a storage unit that collects and manages the videos captured by each imaging apparatus 20. The storage unit may be provided in the video transmission apparatus 10 or may be provided in another apparatus (for example, an apparatus installed in the surveillance center 30) that is connected to the video transmission apparatus 10 in a communicable manner. Hereinafter, a case in which an apparatus installed in the surveillance center 30 collects and manages the videos captured by each imaging apparatus 20 will be described. In this case, when selecting the imaging apparatus 20 in S104, the video transmission control unit 120 acquires the identification information of the selected imaging apparatus 20. Then, the video transmission control unit 120 searches the storage unit, using the acquired identification information as a key, and acquires the video captured by the imaging apparatus 20 selected in S104. The video acquired by the video transmission control unit 120 may be a video that is acquired in real time from the imaging apparatus 20 or may be a still image at a certain point of time in the past or a motion picture for a certain period in the past.

Then, the video transmission control unit 120 transmits the video acquired in S106 to the video sharing apparatus (S108). Here, it is assumed that information indicating that the video receiving apparatus 310 in the surveillance center 30 is the video sharing apparatus is set in the video transmission control unit 120 in advance. In this case, the video transmission control unit 120 selects the video receiving apparatus 310 installed in the surveillance center 30 as the video sharing apparatus and transmits the video acquired in S106 to the video receiving apparatus 310.

In a case in which the guard 40 carries the video receiving apparatus 410, the video transmission control unit 120 may select the video receiving apparatus 410 as a video sharing apparatus other than the video receiving apparatus 310 in the surveillance center 30. In this case, the video transmission control unit 120 operates as follows. First, the video transmission control unit 120 selects at least one guard 40 from among the guards 40 that are positioned in the area to be surveilled, using guard position information indicating the position of the guard 40 carrying the video receiving apparatus 410 and the specified-position information acquired in S102. Then, the video transmission control unit 120 selects the video receiving apparatus 410 carried by the selected guard 40 as the video sharing apparatus.

Specifically, the video transmission control unit 120 calculates a distance between the position indicated by the specified-position information acquired in S102 and the position indicated by the guard position information of the guard 40 and identifies guard position information in which the calculated distance is equal to or less than a predetermined threshold value. The predetermined threshold value is stored in, for example, the memory 103 or the storage 104 in advance and the video transmission control unit 120 reads the stored threshold value and uses the threshold value. For example, the guard position information is stored in the storage unit in the format illustrated in FIG. 6.

FIG. 6 is a diagram illustrating an example of the storage unit that stores the guard position information. The information of the guard illustrated in FIG. 6 may be stored in, for example, the storage 104 of the video transmission apparatus 10 or may be stored in a storage (not illustrated) of another apparatus that is connected to the video transmission apparatus 10 in a communicable manner. The storage unit illustrated in FIG. 6 stores the guard position information and the address information (for example, an IP address) of the video receiving apparatus 410 so as to be associated with the identification information of each guard 40.

For example, the video transmission control unit 120 can ascertain whether or not each guard 40 carries the video receiving apparatus 410 by checking whether the address information of the video receiving apparatus 410 is set. As can be seen from the example illustrated in FIG. 6, the guards 40 that are identified by ID001 and ID002 carry the video receiving apparatuses 410 and the guard 40 that is identified by ID003 does not carry the video receiving apparatus 410. In this case, the video transmission control unit 120 acquires the guard position information of the guards 40 identified by ID001 and ID002. Then, the video transmission control unit 120 calculates the distance between each of the acquired guard position information items and the position indicated by the specified-position information acquired in S102. Here, preferably, the video transmission control unit 120 calculates a temporal distance between the position indicated by the specified-position information acquired in S102 and the position indicated by the guard position information of the guard 40. For example, the video transmission control unit 120 identifies a route from the position indicated by the guard position information to the position indicated by the specified-position information, using map information corresponding to the area to be surveilled, and calculates the estimated time required (temporal distance). The estimated time required can be calculated by the function of a so-called navigation apparatus. Here, the video transmission control unit 120 may estimate the degree of congestion of a route connecting two points on the basis of the analysis result of a video of the route and may incorporate the degree of congestion into a parameter of an expression for calculating the temporal distance.

Then, the video transmission control unit 120 compares the calculated distance with a predetermined threshold value and identifies guard position information in which the distance is equal to or less than the predetermined threshold value. Then, the video transmission control unit 120 selects a guard 40 corresponding to the identified guard position information as an object to share the video with. Specifically, the video transmission control unit 120 acquires the address information of the video receiving apparatus 410 carried by the guard 40 corresponding to the identified guard position information to identify an object to share the video with. Then, the video receiving apparatus 410 transmits the video acquired in S106 to the identified video receiving apparatus 410.

In this operation example, the video captured by the imaging apparatus that is present in the vicinity of the position indicated by the specified-position information is shared by the surveillant in the surveillance center 30. Here, for example, the specified-position information is specified as the place where an urgent situation reported by the guard 40 performing a surveillance operation on the spot occurs or the place to be closely watched. That is, the video to be shared means a video with the high urgency or importance in surveillance operation. Therefore, the surveillant in the surveillance center 30 can check the video from which a situation is to be rapidly recognized or the video to be closely watched and give appropriate instructions to the guard 40 on the spot. In addition, the guard 40 on the way to the position indicated by the specified-position information can also share the video. Therefore, the guard 40 can grasp what is happening in the place where an unexpected situation has occurred before the guard 40 arrives on the spot and rapidly deal with the situation.

Modification Examples

In the above description, the video transmission apparatus 10 and the imaging apparatus 20 are separately provided. However, each function (the specified-position information acquisition unit 110 and the video transmission control unit 120) of the video transmission apparatus 10 may be incorporated into the imaging apparatus 20 (for example, a surveillance camera). In this case, each imaging apparatus illustrated in FIG. 2 is configured as a so-called intelligent camera that has each function of the video transmission apparatus 10. In this case, the video transmission apparatus 10 illustrated in FIG. 2 may not be connected.

The specified-position information acquisition unit 110 acquires the specified-position information indicating the specified position in the area to be surveilled. As described above, the specified-position information acquisition unit 110 may acquire the specified-position information generated according to the input operation of the surveillant in the surveillance center. In addition, the specified-position information acquisition unit 110 may acquire the specified-position information which has been generated on the basis of, for example, the position to be closely watched or the position where the probability of a risk (a crime or an accident) occurring is high and then stored in the storage unit of the imaging apparatus 20.

In a case in which a predetermined relationship is established between the imaging position information indicating the position of the surveillance camera or the imaging range of the surveillance camera and the specified-position information acquired by the specified-position information acquisition unit 110, the video transmission control unit 120 transmits the video captured by the imaging unit to the video sharing apparatus which is an apparatus to share the video. Here, for example, the "predetermined relationship" is that the distance which can be calculated from the position indicated by the specified-position information and the position or the range indicated by the imaging position information is less than a predetermined threshold value (that is, the distance between two positions that can be identified by the specified-position information and the imaging position information is less than a predetermined distance). The video sharing apparatus is selected from the video receiving apparatus provided in the surveillance center or the video receiving apparatus carried by the guard. In addition, the video transmission control unit 120 can acquire the identification information of a video sharing terminal (for example, the destination address of the video sharing terminal) from, for example, a terminal in the surveillance center or the like, store the identification information in a storage area, and identify the video sharing terminal with reference to the storage are.

In the above-described modification examples, it is possible to obtain the same effect as described above.

Second Example Embodiment

This example embodiment has the same functional configuration and hardware configuration as the first example embodiment except the following.

[Functional Configuration and Hardware Configuration]

Figure 7:
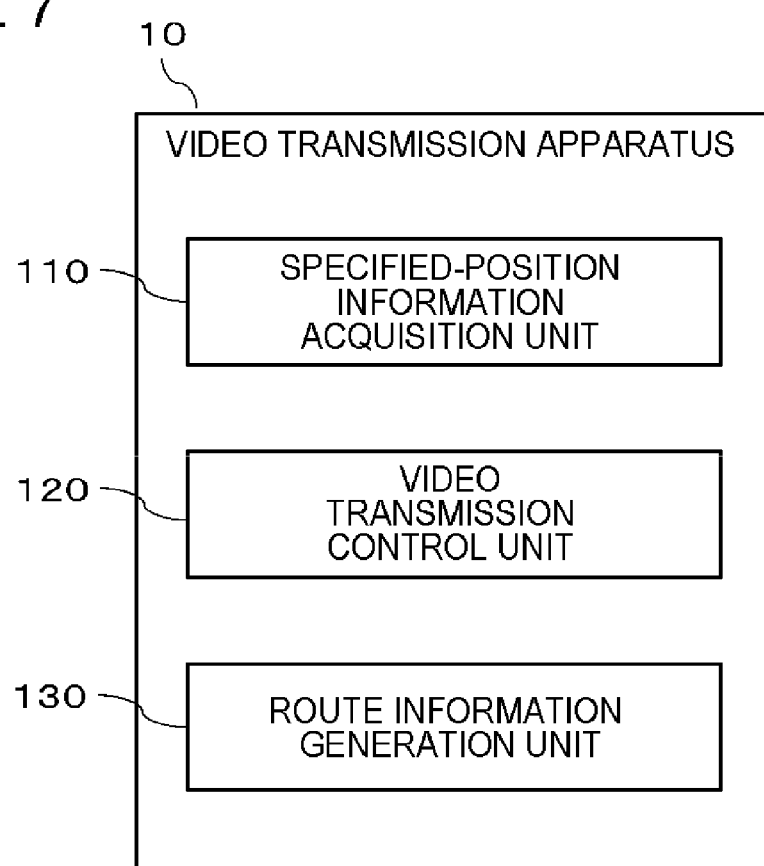
FIG. 7 is a conceptual diagram illustrating the functional configuration of a video transmission apparatus according to a second example embodiment.

FIG. 7 is a conceptual diagram illustrating the functional configuration of a video transmission apparatus 10 according to a second example embodiment. As illustrated in FIG. 7, the video transmission apparatus 10 according to this example embodiment includes a route information generation unit 130, in addition to the configuration according to the first example embodiment. In the video transmission apparatus 10 according to this example embodiment, a program for implementing the function of the route information generation unit 130 which will be described below is further stored in the storage 104. The processor 102 executes the program module to further implement the function of the route information generation unit 130.

As described in the first example embodiment, in some cases, the video transmission control unit 120 selects at least one guard 40 from among the guards 40 positioned in an area to be surveilled and identifies a video receiving apparatus 410 of the guard 40 as the video sharing apparatus. In this example embodiment, the route information generation unit 130 generates guard route information indicating the moving route that should be taken by the guard 40 selected by the video transmission control unit 120, on the basis of the guard position information of the selected guard 40 and the specified-position information acquired by the specified-position information acquisition unit 110. In this example embodiment, the video transmission control unit 120 additionally selects an imaging apparatus 20 whose imaging range includes the moving route that should be taken by a guard that is selected as a guard to share a video, using the guard route information generated by the route information generation unit 130.

The video transmission control unit 120 may transmit the video captured by the imaging apparatus 20 that has been additionally selected using the guard route information generated by the route information generation unit 130, in association with the guard route information, to the video sharing apparatus. The video sharing apparatus is, for example, the video receiving apparatus 310 in the surveillance center 30 or the video receiving apparatus 410 of the guard 40.

Operation Example

Figure 8:
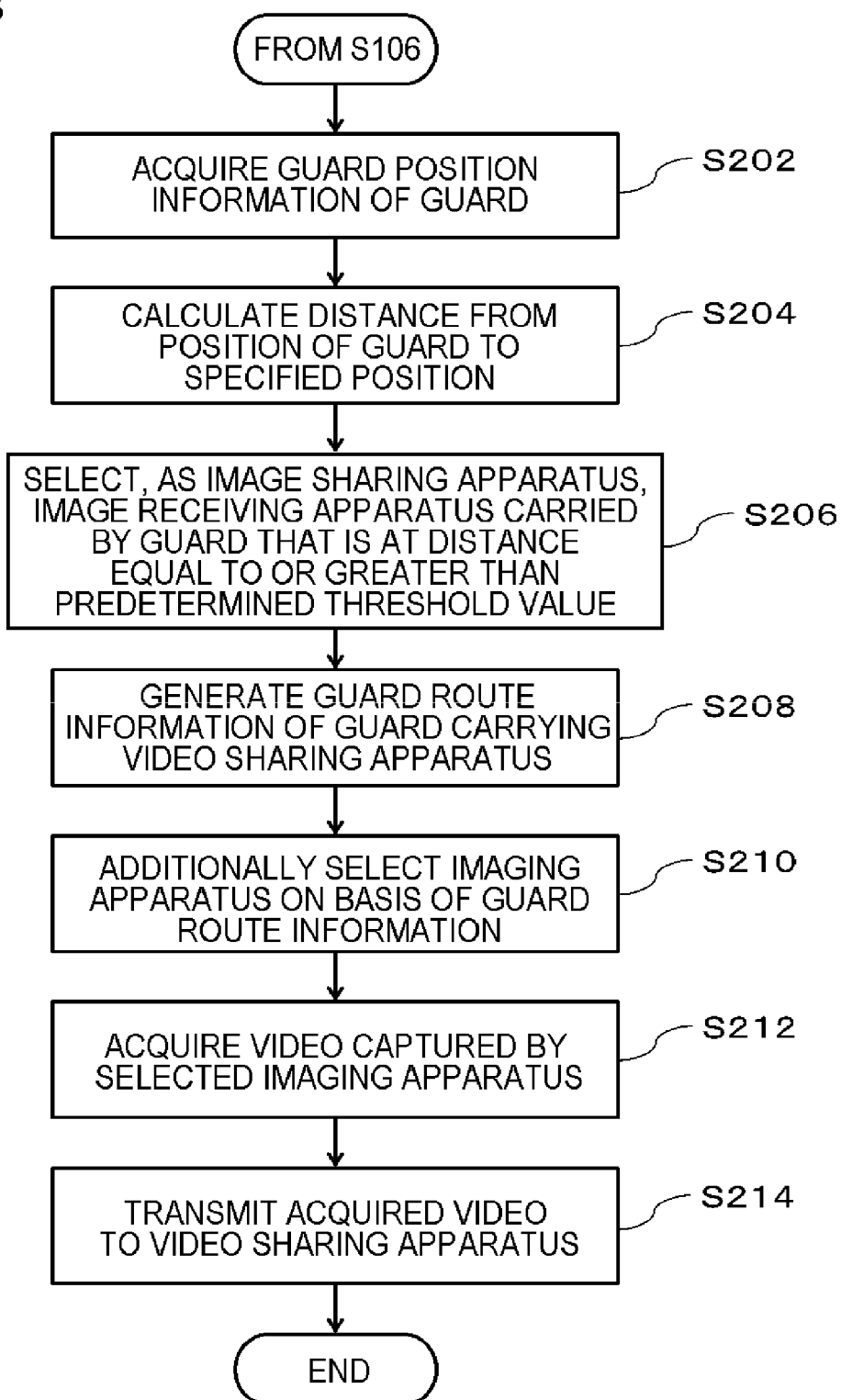
FIG. 8 is a flowchart illustrating the flow of a process of the video transmission apparatus according to the second example embodiment.

The flow of a process performed by the video transmission apparatus 10 according to this example embodiment will be described with reference to FIG. 8. FIG. 8 is a flowchart illustrating the flow of the process of the video transmission apparatus 10 according to the second example embodiment. Each process which will be described below is performed, following S106 illustrated in FIG. 3 in the first example embodiment.

First, the video transmission control unit 120 acquires the guard position information of each guard 40 (S202). For example, the video transmission control unit 120 may search the storage unit illustrated in FIG. 6 to acquire the guard position information of each guard 40.

Then, the video transmission control unit 120 calculates the distance from the position indicated by the guard position information acquired in S202 to the position indicated by the specified-position information (S204). Then, the video transmission control unit 120 identifies a guard 40 whose distance from the position indicated by the specified-position information is equal to or less than a predetermined threshold value and selects the video receiving apparatus 410 carried by the guard 40 as the video sharing apparatus (S206). This is as described in the first example embodiment.

Then, the route information generation unit 130 generates information (guard route information) indicating the moving route that should be taken by the guard 40 that carries the video receiving apparatus 410 selected as the video sharing apparatus (S208). First, the route information generation unit 130 identifies two points corresponding to the guard position information that can be acquired from the storage unit illustrated in FIG. 6 and the specified-position information acquired in S102, using the two positional information items. Then, the route information generation unit 130 generates guard route information indicating at least one route connecting the two points, using, for example, a navigation technique for calculating a route between two points on the map. Then, the video transmission control unit 120 additionally selects an imaging apparatus 20 which is a generation source of the video to be shared, on the basis of the guard route information generated by the route information generation unit 130 (S210). In other words, the video transmission control unit 120 additionally selects an imaging apparatus whose imaging range includes the moving route that should be taken by the guard. Here, the imaging apparatus is additionally selected for each route.

Figure 9:
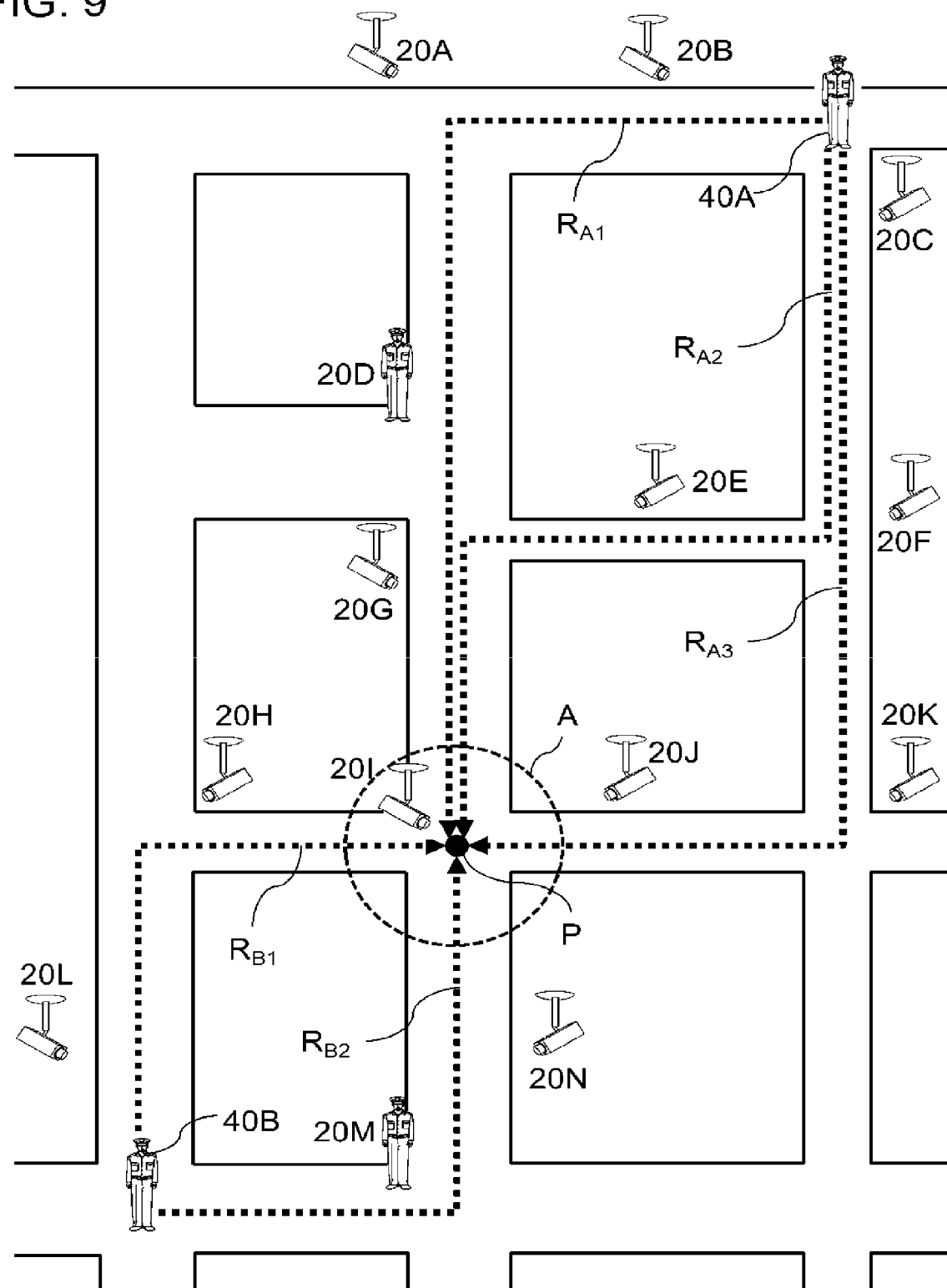
FIG. 9 is a diagram illustrating the flow of a process in which a route information generation unit generates guard route information.

A detailed flow will be described with reference to FIG. 9. FIG. 9 is a diagram illustrating the flow of a guard route information generation process of the route information generation unit 130. In FIG. 9, it is assumed that the specified-position information indicates the position of a point P and an imaging apparatus 201 that is present in a range represented by an area A is selected as the imaging apparatus 20 which captures the video to be shared. In addition, in FIG. 9, it is assumed that guards represented by reference numerals 20D and 20M are guards (fixed-position guards) that stand still in the spot and carry the imaging apparatuses 20. Furthermore, it is assumed that guards represented by reference numerals 40A and 40B are, as we say, guards (patrolling guards) going around an area to be surveilled.

The route information generation unit 130 generates guard route information for each guard on the basis of the coordinates (specified-position information) of the point P and the guard position information of each of the guard 40A and the guard 40B. In FIG. 9, the route information generation unit 130 generates three routes ($R_{A1}$, $R_{A2}$, and $R_{A3}$) as the moving route that should be taken by the guard 40A. In addition, the route information generation unit 130 generates two routes ($R_{B1}$ and $R_{B2}$) as the moving route that should be taken by the guard 40B.

The video transmission control unit 120 identifies the imaging apparatuses 20 corresponding to each route (that is, having imaging regions including at least a portion of each route), using the guard route information generated in S208 and the imaging position information of each imaging apparatus 20. In the example illustrated in FIG. 9, the video transmission control unit 120 identifies four imaging apparatuses (20B, 20A, 20D, and 20G) as the imaging apparatuses 20 corresponding to the route $R_{A1}$. In addition, the video transmission control unit 120 identifies four imaging apparatuses (20C, 20F, 20E, and 20G) as the imaging apparatuses 20 corresponding to the route $R_{A2}$. The video transmission control unit 120 identifies four imaging apparatuses (20C, 20F, 20K, and 20J) as the imaging apparatuses 20 corresponding to the route $R_{A3}$. The videos captured by the identified imaging apparatuses are shared by the surveillant in the surveillance center 30 or the guard 40A. Similarly, the video transmission control unit 120 identifies two imaging apparatuses (20L and 20H) as the imaging apparatuses 20 corresponding to the route $R_{B1}$. In addition, the video transmission control unit 120 identifies two imaging apparatuses (20M and 20N) as the imaging apparatuses 20 corresponding to the route $R_{B2}$. The identified imaging apparatuses 20 are additionally selected as the generation source of the video to be shared. It should be noted that the video transmission control unit 120 need not additionally select all of the imaging apparatuses on the routes. The video transmission control unit 120 may specify the imaging apparatuses at a predetermined interval on the route from the position of each guard 40 to the specified position. The interval at which the imaging apparatus is selected is determined by, for example, the communication state of the network.

Returning to FIG. 8, the video transmission control unit 120 acquires the video captured by the imaging apparatus 20 additionally selected in S210 (S212). This is the same as that in the first example embodiment. Then, the video transmission control unit 120 transmits the acquired video to the video sharing apparatus (S214).

Advantageous Effect

As described above, in this example embodiment, the imaging apparatus 20 whose imaging region includes at least a portion of the moving route that should be taken by the guard is additionally selected as the generation source of the video to be shared and the video captured by the additionally selected imaging apparatus 20 is transmitted to the video sharing apparatus (the video receiving apparatus 310 in the surveillance center 30 or the video receiving apparatus 310 of the guard 40). The additionally transmitted video shows the state of at least a portion of the moving route that should be taken by the guard. Therefore, the surveillant in the surveillance center 30 or the guard 40 can check the additionally transmitted video to appropriately determine what moving route should be taken.

In S214, the video transmission control unit 120 may further transmit the guard route information generated in S208. In this case, the video transmission control unit 120 associates each route indicated by the guard route information with the video captured by the imaging apparatus 20 additionally selected for each route in S210 and transmits the video to the video sharing apparatus. Therefore, the surveillant in the surveillance center 30 or the guard 40 in the spot can recognize the videos for each route and easily organize information in determining the moving route that should be taken.

In this example embodiment, in a case in which guard route information indicating a plurality of routes as the moving route that should be taken by the guard 40 is generated as illustrated in FIG. 9, in some cases the surveillant in the surveillance center 30 determines the moving route that should be taken by the guard 40. In this case, the route information generation unit 130 transmits the guard route information indicating the plurality of routes as the moving route that should be taken by the guard 40 to an apparatus provided in the surveillance center 30. The surveillant in the surveillance center 30 selects the moving route that should be taken by the guard from among the plurality of routes indicated by the guard route information. Here, the videos for each route may be associated with the guard route information transmitted by the route information generation unit 130. In this case, the surveillant in the surveillance center 30 can see the videos for each route and select the moving route that should be taken by the guard. The video transmission control unit 120 receives the information of the selected route and selects the imaging apparatus 20 corresponding to the received route. Then, the video transmission control unit 120 acquires the video captured by the selected imaging apparatus 20. Then, the video transmission control unit 120 transmits the acquired video to the video receiving apparatus carried by the guard identified in S206. Then, the guard 40 carrying the video receiving apparatus selected as the video sharing apparatus can share the video for the route specified by the surveillance center 30 and grasp the state of the route to the destination.

Third Example Embodiment

This example embodiment has the same functional configuration and hardware configuration as the first and second example embodiments except the following. Hereinafter, this example embodiment will be described on the basis of the configuration according to the first example embodiment. A video transmission apparatus 10 according to this example embodiment may further include the configuration according to the second example embodiment.

[Functional Configuration and Hardware Configuration]

The video transmission apparatus 10 according to this example embodiment has the same configuration as the functional configuration illustrated in FIG. 1. In this example embodiment, a flow line for guiding a crowd is predetermined in an area to be surveilled. Then, a video transmission control unit 120 according to this example embodiment additionally selects an imaging apparatus 20 whose imaging range includes a region that is located before the position indicated by specified-position information acquired by the specified-position information acquisition unit 110 on the flow line. In addition (or alternatively), the video transmission control unit 120 according to this example embodiment additionally selects an imaging apparatus 20 whose imaging range includes a region that is located after the position indicated by the specified-position information acquired by the specified-position information acquisition unit 110 on the flow line.

Operation Example

Figure 10:
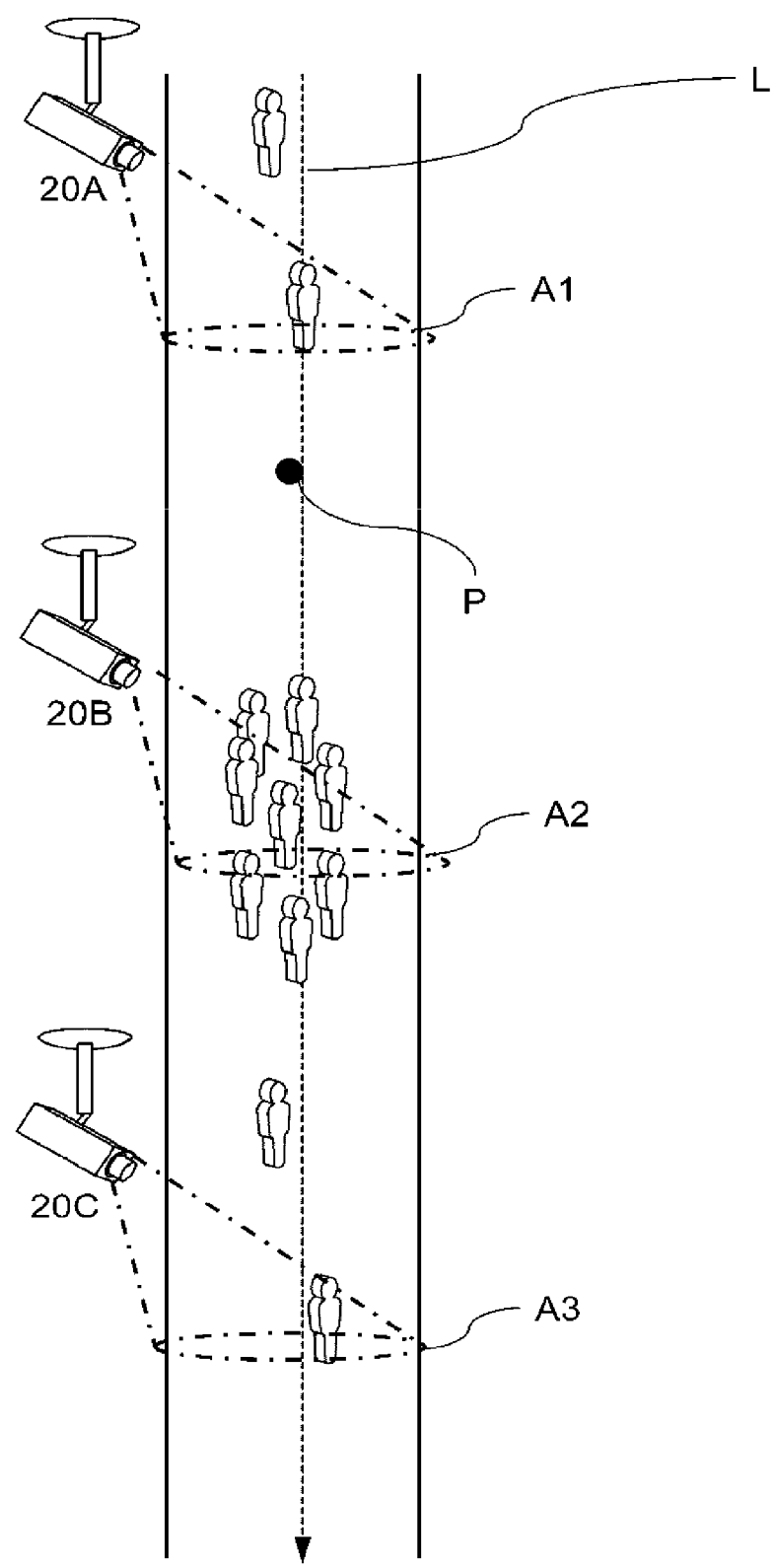
FIG. 10 is a diagram illustrating the flow of a process of a video transmission apparatus according to a third example embodiment.

The flow of a process of the video transmission apparatus 10 according to this example embodiment will be described with reference to FIG. 10. FIG. 10 is a diagram illustrating the flow of the process of the video transmission apparatus 10 according to this example embodiment. In FIG. 10, a point P is the position indicated by the specified-position information. In FIG. 10, a line L is a flow line that is predetermined in, for example, a security plan. The information of the flow line L is stored in the memory 103 or the storage 104 in advance. In FIG. 10, A1, A2, and A3 indicate the imaging range of an imaging apparatus 20A, the imaging range of an imaging apparatus 20B, and the imaging range of an imaging apparatus 20C, respectively. Information indicating the imaging range of each imaging apparatus 20 is stored in, for example, the storage unit illustrated in FIG. 4.

The video transmission control unit 120 acquires the information (imaging position information) indicating the imaging ranges of the imaging apparatuses 20A, 20B, and 20B with reference to the storage unit illustrated in FIG. 4. The video transmission control unit 120 may acquire information about the installation position of each of the imaging apparatuses 20A, 20B, and 20C as the information indicating the imaging range. Then, the video transmission control unit 120 at least selects the imaging apparatus 20B whose imaging range includes a region that is located after the position (point P) indicated by the specified-position information on the flow line L (that is, in the direction in which the flow line L extends). The video transmission control unit 120 may further select the imaging apparatus 20C whose imaging range includes a region that is located before the point P on the flow line L according to conditions such as a predetermined distance from the point P or a predetermined number. In addition, in the example illustrated in FIG. 10, the video transmission control unit 120 may select the imaging apparatus 20C instead of the imaging apparatus 20B. The video transmission control unit 120 further selects the imaging apparatus 20A whose imaging range includes a region that is located before the position (point P) indicated by the specified-position information on the flow line L (that is, in a direction opposite to the direction in which the flow line L extends). Here, the video transmission control unit 120 selects the imaging apparatus whose imaging range includes at least one of the regions that are located after and before the point P on the flow line L.

Advantageous Effect

As described above, in this example embodiment, the imaging apparatus 20 whose imaging range includes at least one of the regions that are located after and before the position indicated by the specified-position information on a predetermined flow line is selected and the video captured by the imaging apparatus 20 is shared. Here, it is considered that the regions located after and before the position where an unexpected situation or the like has occurred are likely to be affected by the unexpected situation. According to the configuration of this example embodiment, in a case in which an unexpected situation or the like occurs, the surveillant in the surveillance center 30 or the guard 40 in the spot can share the video captured at the position that is likely to be affected by the unexpected situation or the like. Then, the surveillant in the surveillance center 30 or the guard 40 in the spot can appropriately determine the situation around the position where the unexpected situation or the like has occurred.

For example, in some cases, in a large event, a flow line for guiding participants in the event is predetermined. In a case in which an unexpected incident occurs in the situation that a crowd moves along the predetermined flow line, the participants in the event might not move as expected due to the incident and stay before the position where the incident has occurred. The staying of the participants may cause a secondary accident before the position where the unexpected incident has occurred. For this reason, when either one of an imaging apparatus 20 whose imaging range includes a region that is located after the point P on the flow line or an imaging apparatus 20 whose imaging range includes a region that is located before the point P on the flow line is to be selected, it is preferable to select the latter. However, the selection of the imaging apparatus is not particularly limited. When an unexpected incident occurs, the surveillant in the surveillance center 30 or the guard 40 in the spot can share the video captured at a position where a secondary accident is likely to occur and take appropriate measures for preventing the secondary accident or minimizing the damage.

Fourth Example Embodiment

In the invention, a case in which not only a video captured by a surveillance camera but also a video taken by a guard in an area to be surveilled is shared is considered. A video transmission apparatus 10 according to this example embodiment further has a configuration for improving the quality of a video captured by an imaging apparatus carried by a guard in a case in which the captured video is shared. This example embodiment has the same functional configuration and hardware configuration as the first to third example embodiments except the following. Hereinafter, this example embodiment will be described on the basis of the configuration according to the first example embodiment. The video transmission apparatus 10 according to this example embodiment may further include the configurations according to the second and third example embodiments.

[Functional Configuration and Hardware Configuration]

The video transmission apparatus 10 according to this example embodiment has the same configuration as the functional configuration illustrated in FIG. 1. In this example embodiment, at least one guard 40 carries the imaging apparatus 20. In a case in which an imaging apparatus 20 carried by the guard 40 is selected as the imaging apparatus 20 which is a generation source of the video to be shared, a video transmission control unit 120 according to this example embodiment outputs notification information for notifying that the video is shared to a notification apparatus carried by the guard 40.

Figure 11:
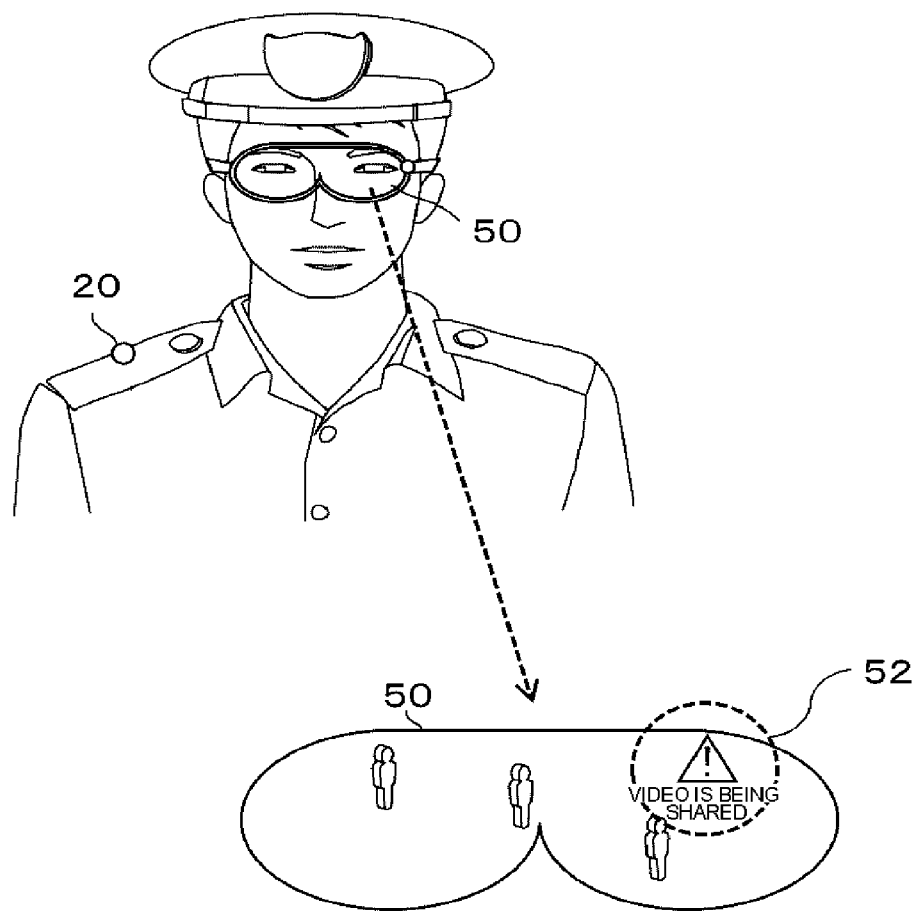
FIG. 11 is a diagram illustrating an example of a notification apparatus carried by a guard in a fourth example embodiment.

The notification apparatus has a notification function (for example, FIG. 11) of notifying the guard 40 that the video is being shared. FIG. 11 is a diagram illustrating an example of the notification apparatus carried by the guard in the fourth example embodiment. FIG. 11 illustrates an example in which a head-mounted display 50 worn by the guard 40 is used as the notification apparatus. FIG. 11 illustrates an example in which an imaging apparatus 20 (wearable camera) is mounted on the right shoulder of the guard 40. When the video captured by the imaging apparatus 20 illustrated in FIG. 11 is shared by the video transmission apparatus 10, the video transmission control unit 120 outputs the notification information to the notification apparatus (head-mounted display 50) of the guard 40 that carries the imaging apparatus 20. When receiving the notification information, the head-mounted display 50 displays the notification information as represented by reference numeral 52 in FIG. 11. The guard 40 illustrated in FIG. 11 can see a message "the video is being shared" displayed on the head-mounted display 50 and recognize that the video captured by the imaging apparatus 20 of the guard is currently being shared.

However, the invention is not limited to the example illustrated in FIG. 11. The notification apparatus can be implemented by any device. For example, the notification apparatus may be an earphone that is worn in the ear of the guard 40 or a portable terminal (for example, a tablet terminal or a smart phone) that is carried by the guard 40. The notification function of the notification apparatus is not particularly limited. For example, the video transmission control unit 120 may output information indicating that the video is being shared as a voice from a voice output unit of the notification apparatus. In addition, the video receiving apparatus 410 of the guard 40 may also have the function of the notification apparatus.

Advantageous Effect

As described above, according to this example embodiment, in a case in which the video captured by the imaging apparatus 20 carried by a certain guard 40 is shared, the video transmission control unit 120 outputs the notification information to the notification apparatus worn by the guard 40. The notification information is information indicating that the video is currently being shared. The notification information enables the guard 40 to recognize that the video captured by the imaging apparatus 20 of the guard 40 is currently being shared. The guard 40 that has recognized that the video captured by the imaging apparatus 20 of the guard 40 is currently being shared moves carefully to take the video required for guarding. As a result, it is possible to acquire a high-quality video. The video is shared by a plurality of persons, leading to accurate recognition of the situation.

Here, the video transmission control unit 120 may display the video that is currently being shared on the notification apparatus of the guard 40. With this configuration, in a case in which there is a problem in the video (for example, the video is out of focus or the imaging range or the imaging direction deviates), the guard 40 can correct the problem while seeing the shared video.

The example embodiments of the invention have been described with reference to the drawings. However, the example embodiments are illustrative examples of the invention. The above-described embodiments may be combined with each other or various configurations other than the above-mentioned configurations may be used.

Next, an example of a reference example embodiment will be additionally described.

1. A video transmission apparatus including:
a specified-position information acquisition unit that acquires specified-position information indicating a specified position in an area to be surveilled including each imaging region corresponding to each of a plurality of imaging apparatuses; and
a video transmission control unit that selects at least one imaging apparatus from among the plurality of imaging apparatuses using imaging position information indicating a position or an imaging range of each of the plurality of imaging apparatuses and the specified-position information and transmits a video captured by the selected imaging apparatus to a video sharing apparatus that is to share the video.

2. The video transmission apparatus according to 1, wherein the video transmission control unit selects at least one guard using guard position information indicating a position of a guard that carries a video receiving apparatus and the specified-position information and selects the video receiving apparatus carried by the selected guard as the video sharing apparatus.

3. The video transmission apparatus according to 2, wherein the video transmission control unit calculates a distance between the position indicated by the specified-position information and the position indicated by the guard position information and selects a guard corresponding to guard position information in which the calculated distance is equal to or less than a predetermined threshold value.

4. The video transmission apparatus according to 3,
wherein the video transmission control unit calculates a temporal distance between the position indicated by the specified-position information and the position indicated by the guard position information.

5. The video transmission apparatus according to any one of 2 to 4, further including:
a route information generation unit that generates guard route information indicating a moving route that should be taken by the selected guard on the basis of the guard position information of the selected guard and the specified-position information,
wherein the video transmission control unit additionally selects an imaging apparatus whose imaging range includes the moving route that should be taken by the selected guard using the guard route information.

6. The video transmission apparatus according to 5,
wherein the video transmission control unit associates a video which is captured by the imaging apparatus selected using the guard route information with the guard route information and transmits the video to the video sharing apparatus.

7. The video transmission apparatus according to 5,
wherein the route information generation unit transmits the guard route information indicating a plurality of routes as the moving route that should be taken by the guard to a surveillance center, and
the video transmission control unit receives information of a route selected from among the plurality of routes from the surveillance center and transmits a video which is captured by an imaging apparatus selected using the received information of the route to the video receiving apparatus carried by the selected guard.

8. The video transmission apparatus according to 1,
wherein the video transmission control unit selects a video receiving apparatus provided in a surveillance center as the video sharing apparatus.

9. The video transmission apparatus according to any one of 1 to 8,
wherein a flow line for guiding a crowd is predetermined in the area to be surveilled, and
the video transmission control unit selects the imaging apparatus whose imaging range includes a region that is located before the position indicated by the specified-position information on the flow line.

10. The video transmission apparatus according to any one of 1 to 8,
wherein a flow line for guiding a crowd is predetermined in the area to be surveilled, and
the video transmission control unit selects the imaging apparatus whose imaging range includes a region that is located after the position indicated by the specified-position information on the flow line.

11. The video transmission apparatus according to any one of 1 to 10,
wherein the at least one imaging apparatus is carried by at least one guard, and
in a case in which the imaging apparatus carried by the at least one guard is selected, the video transmission control unit outputs notification information for notifying that a video is shared to a notification apparatus carried by the guard.

12. A video transmission method performed by a computer, the method including:
acquiring specified-position information indicating a specified position in an area to be surveilled including each imaging region corresponding to each of a plurality of imaging apparatuses; and
selecting at least one imaging apparatus from among the plurality of imaging apparatuses using imaging position information indicating a position or an imaging range of each of the plurality of imaging apparatuses and the specified-position information and transmitting a video captured by the selected imaging apparatus to a video sharing apparatus that is to share the video.

13. The video transmission method performed by the computer according to 12, the method further including:
selecting at least one guard using guard position information indicating a position of a guard that carries a video receiving apparatus and the specified-position information and selecting the video receiving apparatus carried by the selected guard as the video sharing apparatus.

14. The video transmission method performed by the computer according to 13, the method further including:
calculating a distance between the position indicated by the specified-position information and a position indicated by the guard position information and selecting a guard corresponding to the guard position information in which the calculated distance is equal to or less than a predetermined threshold value.

15. The video transmission method performed by the computer according to 14, the method further including:
calculating a temporal distance between the position indicated by the specified-position information and the position indicated by the guard position information.

16. The video transmission method performed by the computer according to any one of 13 to 15, the method further including:
generating guard route information indicating a moving route that should be taken by the selected guard on the basis of the guard position information of the selected guard and the specified-position information; and
additionally selecting an imaging apparatus whose imaging range includes the moving route that should be taken by the selected guard using the guard route information.

17. The video transmission method performed by the computer according to 16, the method further including:
associating a video which is captured by the imaging apparatus selected using the guard route information with the guard route information and transmitting the video to the video sharing apparatus.

18. The video transmission method performed by the computer according to 16, the method further including:
transmitting the guard route information indicating a plurality of routes as the moving route that should be taken by the guard to a surveillance center;
receiving information of a route selected from among the plurality of routes from the surveillance center; and
transmitting a video which is captured by an imaging apparatus selected using the received information of the route to the video receiving apparatus carried by the selected guard.

19. The video transmission method performed by the computer according to 12, the method further including:
selecting a video receiving apparatus provided in a surveillance center as the video sharing apparatus.

20. The video transmission method performed by the computer according to any one of 12 to 19,
wherein a flow line for guiding a crowd is predetermined in the area to be surveilled,
the video transmission method further including selecting the imaging apparatus whose imaging range includes a region that is located before the position indicated by the specified-position information on the flow line.

21. The video transmission method performed by the computer according to any one of 12 to 19,
wherein a flow line for guiding a crowd is predetermined in the area to be surveilled,
the video transmission method further including selecting the imaging apparatus whose imaging range includes a region that is located after the position indicated by the specified-position information on the flow line.

22. The video transmission method performed by the computer according to any one of 12 to 21,
wherein the at least one imaging apparatus is carried by at least one guard,
the video transmission method further including outputting, in a case in which the imaging apparatus carried by the at least one guard is selected, notification information for notifying that a video is shared to a notification apparatus carried by the guard.

23. A program causing a computer to function as:
a specified-position information acquisition unit that acquires specified-position information indicating a specified position in an area to be surveilled including each imaging region corresponding to each of a plurality of imaging apparatuses; and
a video transmission control unit that selects at least one imaging apparatus from among the plurality of imaging apparatuses using imaging position information indicating a position or an imaging range of each of the plurality of imaging apparatuses and the specified-position information and transmits a video captured by the selected imaging apparatus to a video sharing apparatus that is to share the video.

24. The program according to 23, further causing the computer to function as:
a unit that selects at least one guard using guard position information indicating a position of a guard that carries a video receiving apparatus and the specified-position information and selects the video receiving apparatus carried by the selected guard as the video sharing apparatus.

25. The program according to 24, further causing the computer to function as:
a unit that calculates a distance between the position indicated by the specified-position information and the position indicated by the guard position information and selects a guard corresponding to the guard position information in which the calculated distance is equal to or less than a predetermined threshold value.

26. The program according to 25, further causing the computer to function as:
a unit that calculates a temporal distance between the position indicated by the specified-position information and the position indicated by the guard position information.

27. The program according to any one of 24 to 26, further causing the computer to function as:
a route information generation unit that generates guard route information indicating a moving route that should be taken by the selected guard on the basis of the guard position information of the selected guard and the specified-position information; and
a unit that additionally selects an imaging apparatus whose imaging range includes the moving route that should be taken by the selected guard using the guard route information.

28. The program according to 27, further causing the computer to function as:
a unit that associates a video which is captured by the imaging apparatus selected using the guard route information with the guard route information and transmits the video to the video sharing apparatus.

29. The program according to 27, further causing the computer to function as:
a unit that transmits the guard route information indicating a plurality of routes as the moving route that should be taken by the guard to a surveillance center, receives information of a route selected from among the plurality of routes from the surveillance center, and transmits a video which is captured by an imaging apparatus selected using the received information of the route to the video receiving apparatus carried by the selected guard.

30. The program according to 23, further causing the computer to function as:
a unit that selects a video receiving apparatus provided in a surveillance center as the video sharing apparatus.

31. The program according to any one of 23 to 30,
wherein a flow line for guiding a crowd is predetermined in the area to be surveilled,
the program further causing the computer to function as a unit that selects the imaging apparatus whose imaging range includes a region that is located before the position indicated by the specified-position information on the flow line.

32. The program according to any one of 23 to 30,
wherein a flow line for guiding a crowd is predetermined in the area to be surveilled,
the program further causing the computer to function as a unit that selects the imaging apparatus whose imaging range includes a region that is located after the position indicated by the specified-position information on the flow line.

33. The program according to any one of 23 to 32,
wherein the at least one imaging apparatus is carried by at least one guard,
the program further causing the computer to function as a unit that, in a case in which the imaging apparatus carried by the at least one guard is selected, outputs notification information for notifying that a video is shared to a notification apparatus carried by the guard.

34. An imaging apparatus including:
an imaging unit;
a specified-position information acquisition unit that acquires specified-position information indicating a specified position in an area to be surveilled; and
a video transmission control unit that, in a case in which a predetermined relationship is established between imaging position information indicating a position or an imaging range of the surveillance camera and the specified-position information, transmits a video captured by the imaging unit to a video sharing apparatus that is to share the video.

The invention claimed is:
1. A video sharing system comprising:
at least one memory storing instructions; and
at least one processor configured to execute the instructions to:
acquire specified-position information indicating a specified position in an area including imaging regions corresponding to respective ones of a plurality of imaging apparatuses, the plurality of imaging apparatuses including a mobile camera worn by a guard;

select, from among the plurality of imaging apparatuses, at least one imaging apparatus such that relation between a position or an imaging range of the at least one imaging apparatus and the specified position satisfies a predetermined condition, by using the specified-position information and imaging position information indicating a position or an imaging range of each of the plurality of imaging apparatuses;

transmit a video generated by the selected at least one imaging apparatus to at least one video reception apparatus; and cause, when the mobile camera worn by the guard is selected, a notification apparatus carried by the guard to output notification information for notifying that the video generated by the mobile camera is being shared.

2. The video sharing system according to claim 1, wherein the notification apparatus is a head-mounted display, and the at least one processor is further configured to cause the head-mounted display to display a message representing the notification information.

3. The video sharing system according to claim 1, wherein the at least one processor is further configured to cause the notification apparatus to output the notification information by audio.

4. The video sharing system according to claim 1, wherein the at least one processor is further configured to cause the notification apparatus to display a video that is being shared.

5. The video sharing system according to claim 1, wherein the at least one processor is further configured to:

receive a designation of a position in the area, the designation being input by an operation on a map of the area displayed on a display device;

set the designation as the specified-position information; and select the at least one imaging apparatus such that a distance between each of the at least one imaging apparatus and the specified position falls within a predetermined distance.

6. A video sharing method comprising:

acquiring specified-position information indicating a specified position in an area including imaging regions corresponding to respective ones of a plurality of imaging apparatuses, the plurality of imaging apparatuses including a mobile camera worn by a guard;

selecting, from among the plurality of imaging apparatuses, at least one imaging apparatus such that relation between a position or an imaging range of the at least one imaging apparatus and the specified position satisfies a predetermined condition, by using the specified-position information and imaging position information indicating a position or an imaging range of each of the plurality of imaging apparatuses;

transmitting a video generated by the selected at least one imaging apparatus to at least one video reception apparatus; and causing, when the mobile camera worn by the guard is selected, a notification apparatus carried by the guard to output notification information for notifying that the video generated by the mobile camera is being shared.

7. The video sharing method according to claim 6, wherein the notification apparatus is a head-mounted display, and the video sharing method comprises causing the head-mounted display to display a message representing the notification information.

8. The video sharing method according to claim 6, comprising causing the notification apparatus to output the notification information by audio.

9. The video sharing method according to claim 6, further comprising causing the notification apparatus to display a video that is being shared.

10. The video sharing method according to claim 6, further comprising:

receiving a designation of a position in the area, the designation being input by an operation on a map of the area displayed on a display device;

setting the designation as the specified-position information; and selecting the at least one imaging apparatus such that a distance between each of the at least one imaging apparatus and the specified position falls within a predetermined distance.

11. A non-transitory computer-readable storage medium storing a program that causes a computer to perform:

acquiring specified-position information indicating a specified position in an area including imaging regions corresponding to respective ones of a plurality of imaging apparatuses, the plurality of imaging apparatuses including a mobile camera worn by a guard;

selecting, from among the plurality of imaging apparatuses, at least one imaging apparatus such that relation between a position or an imaging range of the at least one imaging apparatus and the specified position satisfies a predetermined condition, by using the specified-position information and imaging position information indicating a position or an imaging range of each of the plurality of imaging apparatuses;

transmitting a video generated by the selected at least one imaging apparatus to at least one video reception apparatus; and causing, when the mobile camera worn by the guard is selected, a notification apparatus carried by the guard to output notification information for notifying that the video generated by the mobile camera is being shared.

12. The storage medium according to claim 11, wherein the program further causes the computer to perform:

the notification apparatus is a head-mounted display, and the video sharing method comprises causing the head-mounted display to display a message representing the notification information.

13. The storage medium according to claim 11, wherein the program further causes the computer to perform causing the notification apparatus to output the notification information by audio.

14. The storage medium according to claim 11, wherein the program further causes the computer to perform causing the notification apparatus to display a video that is being shared.

15. The storage medium according to claim 11, wherein the program further causes the computer to perform:

receiving a designation of a position in the area, the designation being input by an operation on a map of the area displayed on a display device;

setting the designation as the specified-position information; and selecting the at least one imaging apparatus such that a distance between each of the at least one imaging apparatus and the specified position falls within a predetermined distance.

* * * * *

UNITED STATES PATENT AND TRADEMARK OFFICE
CERTIFICATE OF CORRECTION

PATENT NO. : 10,721,435 B2
APPLICATION NO. : 16/402363
DATED : July 21, 2020
INVENTOR(S) : Mika Saito et al.

Page 1 of 1

It is certified that error appears in the above-identified patent and that said Letters Patent is hereby corrected as shown below:

In the Specification

Column 13, Line 48; Delete "201" and insert --20I-- therefor

Signed and Sealed this
Eighth Day of December, 2020

Andrei Iancu
*Director of the United States Patent and Trademark Office*